Patented Aug. 31, 1948

2,448,029

UNITED STATES PATENT OFFICE 2,448,029

METHOD OF PREPARING PHENOLSULFONIC ACID-FORMALDEHYDE ION EXCHANGE AGENTS

George Beal Heusted and William C. Bauman, Midland, Mich., assignors to The Dow Chemical Company, Midland, Mich., a corporation of Delaware No Drawing. Application February 24, 1947, Serial No. 730,548

2 Claims. (Cl. 260—49)

This invention concerns certain improved cation exchange agents and a method of making the same. The exchange agents with which the invention is concerned are sulphonated organic resins prepared by the reaction between nuclear sulphonated phenols and aldehydes.

It is known that cation exchange agents may be prepared by the reaction of nuclear sulphonated phenols with aldehydes, and that the water-insoluble resins thus forced have properties which render them well suited for use as agents for softening water or in other cation exchange processes. However, the methods heretofore known for preparing such resins do not permit the obtaining of a product having as high an absorptive capacity for cations as we have now found may be produced.

Two methods for preparing such nuclear sulphonated resins are known. According to U. S. Patent 2,204,539, such cation exchange resin may be prepared by heating an aqueous mixture of a nuclear sulphonated phenol and an equimolecular amount or more of an aldehyde to a reaction temperature, e. g. of from 90 to 120° C., and grinding and washing with water the resinous mass which is formed. The product thus prepared from paraphenol sulphonic acid and formaldehyde is stated to absorb up to 5 per cent of its own weight of CaO from a solution of calcium chloride. U. S. Patent 2,230,641 discloses the preparation of a cation exchange agent by heating an aqueous mixture of formaldehyde, sodium para-phenol sulphonate and a minor amount of added hydrochloric acid to a reaction temperature, grinding the resultant resinous mass and drying it in a current of dry air. The patent teaches that 45 grams of the exchange agent thus prepared is capable of absorbing 1.8 grams of sodium ions from a 0.1 normal aqueous sodium chloride solution.

We have found that by modifying the method for preparing such resin from that taught in the above-mentioned U. S. Patent 2,204,539, a product may be obtained having a higher absorptive capacity for cations than is possessed by the products of either of the above-mentioned patents.

The improved method provided by the invention is an outgrowth of an observation by us that, during the reaction between a nuclear sulphonated phenol and an aldehyde to form the resin, a considerable part of the sulphonic acid groups present in the phenolic starting material are split from the same, or from the resin as it is formed. The sulphonic acid groups thus split from the reacting materials form sulphuric acid, and possibly other water-soluble sulphur-containing acids, which are removed from the resin in the usual operation of washing the latter with water. As a result of such loss of sulphonic acid groups, the resin product has an absorptive capacity for cations which is far less than it would otherwise possess.

We have found that the sulphonic acid groups which are split from the reacting materials during preparation of the resin may, to a considerable extent, be restored to the resin by omitting the usual step of washing the freshly formed product with water, and, instead, drying the product in a current of air, or other inert gas, at temperatures between 100° and 200° C. prior to contacting the product with added water. During this drying operation, the acids formed by the previous loss of sulphonic acid groups from the product are caused to react with and sulphonate the resin with resultant restoration of a large part of said sulphonic acid groups.

It should be mentioned that during the preparation of a resin by reacting an alkali metal phenol sulphonate with an aldehyde, sulphonate radicals are also split from the sulphonated phenol, or the resin product, with consequent reduction in the absorptive capacity of the resin for cations. In this instance, however, the sulphonate groups thus split from the reacting materials form stable salts, e. g. sodium sulphate, and subsequent drying of the reacted mixture, even at elevated temperatures, does not restore to the resin the sulphonate groups which had been lost during formation of the resin. Accordingly, the method of the present invention is restricted to the employment of a phenol-sulphonic acid as a reactant in forming the resin, and it does not apply when the phenolic reactant is largely in the form of a metal salt of the phenol sulphonic acid. The method may be applied when the phenolic reactant is largely in the form of a phenol sulphonic acid and includes only a minor amount, e. g. 0.1 of its molecular equivalent or less, of a salt of said acid.

In preparing a cation exchange resin in accordance with the invention a nuclear sulphonated phenol, having not more than one hydroxy radical on an aromatic nucleus and having in at least three positions ortho or para to phenolic hydroxyl groups no substituents other than hydrogen or sulphonic acid radicals, is admixed with from 1 to 2, preferably from 1.1 to 1.5, molecular equivalents of an aldehyde, and the mixture is heated to effect reaction between the aldehyde and the phenol sulphonic acid with formation of a solid water-insoluble resin. The reaction is carried out in the presence of at least 2.3 molecular equivalents of water per mole of the aldehyde reactant, which water may be introduced together with an aldehyde as an aqueous solution of the latter. The water serves as a heat transfer agent to permit adequate temperature control and may be used as a medium for the reaction. The reaction is strongly exothermic and, in its early stages, the mixture is usually cooled to prevent overheating. Such reaction between an aqueous formaldehyde solution and phenol sulphonic acid may be started at room temperature or somewhat above. Once started, the temperature usually rises spontaneously and the mixture is cooled to avoid heating to temperatures above about 100° C. Toward the end of the reaction the temperature may, if desired, be increased somewhat, e. g. to 150° C., without damaging the product. This reaction is usually complete in from 1 to 2 hours when carried out, for the most part, at temperatures between 60° and 100° C.

Any of a wide variety of aldehydes and nuclear sulphonated phenols may be used in the reaction. Examples of suitable sulphonated phenols are phenol monosulphonic acid, meta-cresol monosulphonic acid, mono or disulphonated bis-(4-hydroxy-phenyl)-dimethyl-methane, monosulphonated meta-phenylphenol, etc., and mixtures of such sulphonated phenols. Examples of aldehydes which may be used as reactants are formaldehyde, para-formaldehyde, acetaldehyde, aldol, and propionaldehyde, etc., and mixtures of such aldehydes. The resinous material which is produced by the reaction contains 15 per cent by weight or more of occluded water, although it may have the appearance of being dry. The water is not readily vaporized therefrom.

The resinous material may be formed directly as small pellets or granules, or it may be formed as a mass which is ground, cut, or otherwise comminuted, e. g. to smaller than 10 mesh and preferably to from 20 to 80 mesh particle size. It is thereafter heated at temperatures between 100° and 200° C., preferably between 140° and 160° C., to dry the product, and to effect further sulphonation of the same by means of the sulphur-containing acids, e. g. sulphuric acid, which had been formed during preparation of the resin and which are present in the reacted mixture. During this drying operation it is important that a current of air or other inert gas, e. g. nitrogen or carbon dioxide, etc., be passed over or through the body of the comminuted resin, since when this is not done, the resin frequently suffers desulphonation, or is otherwise decomposed, instead of being further sulphonated. Only a mild current of gas is required for the purpose, provided that the gas flowing in linear manner over or through the body of resin is contacted with most, and preferably all, particles of the latter. For instance, we have observed that the drying of the resin on non-perforated metal trays in an oven heated to between 100° and 200° C. without forced circulation of the air in the oven often causes a decrease, rather than an increase, in the absorptive capacity of the resin for cations. However, the same resin may similarly be dried while resting on a metal screen to obtain a marked increase in its absorptive capacity for cations. The air which circulates through the screen and the body of comminuted resin during the drying operation is sufficient to prevent decomposition of the resin and to permit further sulphonation of the latter by the sulphuric acid occluded therein. In practice, the resin is ordinarily dried in a rotary drier while passing a strong current of air through the drier. The drying operation is usually carried out at atmospheric pressure, or thereabout, but it may be carried out under vacuum or at superatmospheric pressure. Temperatures above 200° C. are preferably avoided during the drying operation, since the quality of the product may be impaired by heating it to such high temperatures.

The time of heating required in the drying operation varies depending on the proportion of water present in the product, the moisture content of the gas passed into contact with the resin, and the drying temperatures employed. During drying, the temperature of the resin is increased until the resin is brought to the temperature at which the drying is to be completed. It may be advisable to maintain the resin at this ultimate drying temperature for some time in order to assure completion of the sulphonation reaction. The following is a schedule of periods of time at which the dried products have been maintained at certain drying temperatures with satisfactory results. It will be understood that the schedule is illustrative and that it is not limiting as to the times of heating which may be employed.

| Temperature, °C. | Time of heating |
| --- | --- |
| 100 | 8 Hrs. |
| 140 | 1-2 Hrs. |
| 160 | 0.5-1 Hrs. |
| 180 | 1-15 Mins. |

In any instance, heating is continued until the product retains not more than 10 per cent by weight of water.

The dried product is a powdered or granular resin which is insoluble in water and which possesses an unusually high absorptive capacity for cations and the property of readily exchanging one cation for another. It is well adapted for use as an agent in cation exchange processes, e. g. as an agent for softening water.

The following examples describe several ways in which the principle of the invention has been applied and illustrate certain of its advantages, but are not to be construed as limiting the invention:

Example 1

To 350 parts by weight of para-phenol sulphonic acid, 80 parts of an aqueous formaldehyde solution of 30 per cent by weight concentration was added with stirring while heating the mixture at temperatures of from 55° to 65° C. The temperature was thereafter increased to approximately 100° C. and heating at the latter temperature was continued for a period of one-half hour. The mixture was then cooled to 80° C., and an additional 120 parts by weight of the aqueous formaldehyde solution was added. Thereafter, the mixture was heated at 90° C. for 10 hours, at the end of which time the mixture was in the form of a black resinous mass. The mass was cooled, ground to a powder and the powder was divided into several portions. One portion of the powdered product was washed thoroughly with water and was then tested to determine its capacity for absorbing calcium ions from an aqueous calcium chloride solution. It was found that 100 parts by weight of the resin absorbed calcium ions from the solution in amount corresponding to 0.84 part of CaO. A second sample of the powdered resin, which sample had not been washed with water, was dried by heating the same at 100° C. for 8 hours under conditions such that air flowed over the resin during drying. One hundred parts of the dried product absorbed calcium ions from an aqueous calcium chloride solution in amount corresponding to 8.4 parts of CaO. A third sample of the powdered resin, which sample had not been washed with water, was similarly dried by heating the sample at 100° C. for 72 hours. One hundred parts of the dried product was found to absorb calcium in amount corresponding to 8.54 parts of CaO from an aqueous calcium chloride solution.

Example 2

A mixture of 874 parts by weight of paraphenol sulphonic acid, 225 parts of formaldehyde, and 1550 parts of water was heated at temperatures of from 90° to 100° C. for 10 hours, whereby a resinous mass was formed. The mass was ground to a powder which was divided into several portions. One portion of the powder was washed thoroughly with water. One hundred parts by weight of the washed product was found to absorb calcium in amount corresponding to 1.54 parts of CaO from an aqueous calcium chloride solution. A second portion of the powdered resin, which material had not been washed with water, was dried by heating the same at 100° C. for 6.5 hours under conditions such that air flowed over the resin during drying. One hundred parts of the dried product absorbed calcium in amount corresponding to 5.6 parts of CaO from an aqueous calcium chloride solution. A third portion of the powdered resin, which material had not been washed with water, was similarly dried by heating the same at 100° C. for 23.5 hours. One hundred parts of the dried product absorbed calcium in amount corresponding to 6.3 parts of CaO from an aqueous calcium chloride solution.

This application is a continuation-in-part of our earlier application, Serial No. 503,110, filed September 20, 1943, now abandoned.

Other modes of applying the principle of the invention may be employed instead of those explained, change being made in the steps or compounds herein disclosed, provided the steps or compounds stated by any of the following claims or the equivalent of such stated steps or compounds be employed.

We therefore particularly point out and distinctly claim as our invention:

1. A method for preparing an ion exchange agent which comprises reacting phenol sulphonic acid with from 1 to 2 molecular equivalents of formaldehyde, in the presence of at least 2.3 molecular equivalents of water per mole of formaldehyde, to form a solid resin containing more than 15 per cent by weight of water, and heating a granular body of the unwashed resinous material at temperatures between 100° and 200° C. in contact with a current of a substantially inert gas until it is substantially free of water.

2. A method of preparing an ion exchange agent which comprises reacting phenol sulphonic acid with from 1 to 2 molecular equivalents of formaldehyde, in the presence of at least 2.3 molecular equivalents of water per mole of the formaldehyde, to form a solid resinous mass containing more than 15 per cent by weight of water, comminuting the resinous material and heating the unwashed resinous material at temperatures between 100° and 200° C. in contact with a current of air until it is substantially free of water.

GEORGE BEAL HEUSTED.
WILLIAM C. BAUMAN.